United States Patent
Akiyama et al.

(10) Patent No.: US 6,542,192 B2
(45) Date of Patent: Apr. 1, 2003

(54) IMAGE DISPLAY METHOD AND DIGITAL STILL CAMERA PROVIDING RAPID IMAGE DISPLAY BY DISPLAYING LOW RESOLUTION IMAGE FOLLOWED BY HIGH RESOLUTION IMAGE

(75) Inventors: Hideki Akiyama, Fujisawa (JP); Masaki Izumi, Yokohama (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/949,845

(22) Filed: Oct. 14, 1997

(65) Prior Publication Data
US 2001/0002142 A1 May 31, 2001

(30) Foreign Application Priority Data

Feb. 20, 1997 (JP) .............................................. 9-035893

(51) Int. Cl.⁷ .......................... H04N 5/222; H04N 5/228
(52) U.S. Cl. ................................ 348/333.11; 348/222.1
(58) Field of Search ............................. 358/906, 909.1; 386/68, 109, 110, 112, 117, 120; 348/207, 220, 222, 231–233, 239, 333, 334, 552, 333.01, 333.05, 333.11, 333.12; 382/276, 298, 299, 305; 396/373, 374; H04N 5/225, 5/262, 5/222

(56) References Cited

U.S. PATENT DOCUMENTS

| 4,802,019 A | * | 1/1989 | Harada ........................ 386/68 |
| 4,969,204 A | * | 11/1990 | Melnychuck ................ 382/240 |
| 5,164,831 A | * | 11/1992 | Kuchta ........................ 348/233 |
| 5,440,401 A | * | 8/1995 | Parulski ...................... 386/124 |
| 5,463,419 A | * | 10/1995 | Saito ........................... 348/232 |
| 5,479,206 A | * | 12/1995 | Ueno .......................... 348/552 |
| 5,493,335 A | * | 2/1996 | Parulski ..................... 358/909.1 |
| 5,583,653 A | * | 12/1996 | Timmermans .............. 386/125 |
| 5,724,579 A | * | 3/1998 | Suzuki ........................ 382/305 |
| 5,903,309 A | * | 5/1999 | Anderson ................... 348/232 |
| 5,933,137 A | * | 8/1999 | Anderson ................ 358/909.1 |
| 6,147,703 A | * | 11/2000 | Miller ......................... 348/220 |
| 6,215,523 B1 | * | 4/2001 | Anderson .............. 348/333.05 |
| 6,233,015 B1 | * | 5/2001 | Miller .................... 348/333.05 |
| 6,281,874 B1 | * | 8/2001 | Sivan .......................... 345/127 |

FOREIGN PATENT DOCUMENTS

| JP | 63148777 | 6/1988 | .......... H04N/5/265 |
| JP | 2105679 | 4/1990 | .......... H04N/1/415 |
| JP | 7056942 | 3/1995 | .......... G06F/17/30 |
| JP | 7131784 | 5/1995 | ............ H04N/7/24 |
| WO | 92/05655 | 4/1992 | ............ H04N/1/21 |

\* cited by examiner

*Primary Examiner*—Ngoc-Yen Vu
(74) *Attorney, Agent, or Firm*—David M. Woods; Pamela R. Crocker

(57) ABSTRACT

A digital still camera comprises a full image processor and a rough image processor. The full image processor generates compressed full image data as primary image data, while the rough image processor generates non-compressed rough image data as secondary image data whose data volume has been reduced by limiting pixels thereof. In a reproduction mode, rough image data is read from a memory and subjected to display processing. A rough image is generated based on non-compressed rough image data with a short reproduction waiting time and displayed on an image display device. Thereafter, corresponding full image data is processed for display so that a relevant full image replaces the displayed rough image data, to be finally displayed.

17 Claims, 5 Drawing Sheets

IMAGE DISPLAY METHOD AND DIGITAL STILL CAMERA PROVIDING RAPID IMAGE DISPLAY BY DISPLAYING LOW RESOLUTION IMAGE FOLLOWED BY HIGH RESOLUTION IMAGE

FIELD OF THE INVENTION

The present invention relates to a digital still camera and, in particular, to a digital still camera which stores an image in the form of digital data as image data and performs display processing to the image data.

BACKGROUND OF THE INVENTION

A digital still camera which stores the image of an object in the form of digital data has been known. In such a camera, an image created using an optical system is converted into electric signals by optical-electric conversion elements, such as a CCD. The electric signals are converted into digital data, which is then subjected to predetermined compression processing before being stored in a memory incorporated into the camera.

Although an image photographed by a conventional camera of a film exposure type (a film exposure camera) cannot be seen until the film is developed, a photographed image by a digital still camera can be reproduced and displayed at any desired time by simply reading image data from a memory. This is advantageous and convenient for a digital still camera as it can perform operations which are impossible for a film exposure camera, including examination or erasure of photographed images.

For displaying reproduced images, a digital still camera is equipped with a display device, such as an LCD. After setting a camera in a reproduction mode, a user presses a reproduction button on the camera body, and display processing is performed to image data for one picture. Display processing specifically includes image data reading from a memory, compressed data expansion, color correction, picture size changing, and so forth. Color correction is correction with respect to discrepancies between color data for images outputted from a CCD and those to be inputted into a display device, such as an LCD. With picture size changing, the size of a picture, which is expressed by the number of pixels whose data is contained in image data for one picture (i.e., the number of horizontal pixels×that of vertical pixels), is changed so as to fit the size of a display screen. After display processing as above, an image is displayed on a display device.

As described above, image data is subjected to display processing in response to a user command inputted for display, and a corresponding image is subsequently reproduced and displayed. The period of time between command inputting and image displaying is referred to as a reproduction waiting time, during the majority of which compressed image data is being expanded. Therefore, a high speed expansion could reduce a reproduction waiting time, which is, however, subject to limitation. In a conventional reproduction method, it has taken as long as approximately a few seconds to display a reproduced image due to a long reproduction waiting time. This forces a user to wait for a few seconds after pressing a reproduction button before having a reproduced image displayed. It has thus been long desired to reduce a reproduction waiting time to the level where a reproduced image is displayed almost simultaneously upon operation of a reproduction button by a user.

A digital still camera is further advantageously able to store a larger number of pictures than a film exposure camera. A user searching for a particular picture from among many pictures of photographed images, displays all the pictures sequentially. To be specific, the user presses a reproduction button to display one picture, and if that is not the one he wants, he again presses the button to have another picture displayed. He has to repeat this process until a desired picture appears. In this manner of searching, it takes a long time for a user to find one desired picture from among many pictures when a reproduction waiting time for one picture is long and a whole time necessary to display each picture is inevitably prolonged. With this in mind, it has also been desired to reduce a period of time necessary to display pictures for review.

SUMMARY OF THE INVENTION

The present invention has been conceived to overcome the above problems, and aims to produce a digital still camera in which a reproduced image can be promptly displayed with a reduced reproduction waiting time. The present invention also aims to provide an image reproduction and display method to be employed by a digital still camera which achieves the above object.

(1) In order to achieve the above object, according to the present invention, there is provided a digital still camera having a reproduction function for displaying an image on a display after processing image data stored inside thereof for display, comprising a memory storing image data including primary image data and secondary image data, the secondary image data requiring a shorter time for display processing than the primary image data; a primary image display processor performing display processing on the primary image data; a secondary image display processor performing display processing on the secondary image data; and a display replacer for replacing display images from a secondary image to a primary image after completion of display processing on the primary image data, the secondary image having been displayed in a reproduction mode prior to the primary image.

According to another aspect, there is provided a reproduction and display method adopted by a digital still camera for displaying an image on a display after processing image data stored inside thereof for display, comprising steps of: performing primary image display processing to primary image data; performing secondary image display processing to secondary image data, the secondary image data requiring a shorter time for display processing than the primary image data; and replacing display images from a secondary image to a primary image after completion of display processing on the primary image data, the secondary image having been displayed.

It should be noted that primary image data is used to obtain a normal photographed image, and preferably allows accurate reproduction of an originally photographed image with high image quality. Primary image data may be either non-compressed data or compressed data which has been compressed using a predetermined compression method.

Secondary image data can be processed for display in a shorter period of time than primary image data. High image quality, such as resolution, is not required for secondary image data, as reproduction of an image which is clear enough to distinguish a photographed object is the aim of the secondary image data.

For instance, secondary image data is image data whose data volume has been curtailed to an extent that a reproduced image based thereon is still capable of distinguishing a photographed object. Preferably, secondary image data may be non-compressed data with the data volume reduced, for instance, in sampling processing in which some pixel data are removed, as non-compressed data can be processed for display in a significantly shorter period to time compared to compressed data. Alternatively, compressed data having a reduced data volume may be employed since data having a smaller volume will be processed in a shorter time.

The present invention has been conceived in view of the following facts. Image reproduction based solely on primary image data achieves high quality images but needs a longer reproduction waiting time, whereas image reproduction based solely on secondary image data achieves reduction of a reproduction waiting time but reproduces images with only poor quality. That is, it is difficult to reproduce an image with high quality in a shorter reproduction waiting time based solely on image data of either one of the above two types. In view of the above, this invention is constructed to utilize advantages of image data of both types.

According to this invention, a secondary image picture is first displayed in a reproduction mode and, after completion of display processing for primary image data, the secondary image picture being displayed is replaced by a corresponding primary image picture. Since display processing for secondary image data is short, secondary image pictures can be displayed with only a short reproduction waiting time. The secondary image picture being displayed is automatically replaced by a primary image picture, as mentioned above. With this arrangement, a user barely has to wait until an image is displayed, and he can know the details of a photographed image by examining a primary image picture. The present invention therefore enables both reduction of a reproduction waiting time and displaying of a high quality image. This can increase the product value of a digital still camera.

(2) According to another aspect, in the reproduction and display method as defined above, display processing of primary image data corresponding to a secondary image which is then being displayed is stopped when a predetermined command is externally inputted; and another secondary image is displayed.

According to this aspect, the present invention is quite beneficial for a user who searches a desired picture from among many photographed images by sequentially displaying them. Specifically, a secondary image picture is displayed as soon as a user inputs a command, so that the user reviews it to check an object shown thereon as to whether or not the picture shown is his desired one. If it is not the picture he wants, he inputs another display command. In response to this command, ongoing display processing for a corresponding primary image data is halted and image data for the next secondary image picture is subjected to display processing so that the next secondary image picture is displayed. When the user finds a desired secondary image after repetition of the above process, he stops advancing pictures so that display processing for corresponding primary image data continues to completion. Then, the secondary image picture being displayed is automatically replaced by a relevant primary image picture, so that the user can examine the details of the photographed image by referring to the primary image. As described above, the present invention achieves significant reduction of a period of time necessary for a user to search for a desired photographed image and to examine the details thereof.

(3) In some conventional digital still cameras, non-compressed index image data, such as thumbnail image data, is stored separately from compressed image data. When the present invention is applied to such cameras, index image data may also be used as secondary image data. In such use, display processing for secondary image data may include processing to change the size of index display image data.

Index image data is inherently used for displaying a plurality of pictures simultaneously on a display device when image data is processed by a computer, and suchlike. In this use, high image quality is not absolutely required as each picture is only displayed in a small size, and there is more demand for a shorter processing time before a plurality of pictures are simultaneously displayed. Thus, index image data is generated in sub-sampling processing in which pixel data of original image data is removed, so as to have a smaller data volume. For instance, the data volume of primary image data is a few hundred Kbytes, while that of index image data is $1/10$ thereof or else.

Index image data is usable only to generate a rough image picture which at most distinguishes an image shown thereon, and its resolution is too low to clearly present details or photographed conditions of the image. Index image data hardly allows reproduction of high quality image which is necessary for thorough examination of details. However, it advantageously allows display of an image in a short time as it is non-compressed and has a small data volume. Index image data is therefore preferably used as secondary image data of this invention.

When index display image data is used also as secondary image data unique to the present invention, it is unnecessary to generate image data of another type which has not been conventionally used or to secure memory area for storing such image data within a memory.

It should be noted that the object of this invention can also be achieved by using non-compressed image data which allows reproduction of an image with suitable resolution for the image display device of a camera, stored for use solely in a reproduction mode. With this structure, replacement of a secondary image picture by a primary image picture is unnecessary. However, such image data must have decent resolution, and therefore a relatively large data volume is inevitable so as to match a display device. Even worse, since memory area must be secured for those data, which has a large volume, the number of pictures whose data can be stored in the memory is accordingly reduced. This is contrary to one of the advantages of a digital still camera, i.e., capability to store numerous pictures, and thus not preferable. On the contrary, in this invention, the number of pictures whose data can be stored is not adversely affected as above when secondary image data, having a small data volume, is stored together with primary image data.

(4) In this invention, a memory may be either of a detachable type, like a detachable memory card, or a non-detachable type with respect to a camera. A flash memory is often used for the memory. Alternatively, any other medium accessible in an electric, magnetic, or optical method may be applied, such as a semiconductor memory, an IC card, a magnetic disc, RAM, and a magnetic tape.

Also, primary image data and secondary image data may be stored in the same memory or different memories. Memory areas for primary and secondary image data may be arranged as desired.

Display processing for secondary image data may be performed prior to that for primary image data, or both may be performed in parallel.

BRIEF DESCRIPTION OF THE DRAWINGS

The above and other objects, features, and advantages, will become further apparent from the following description of the preferred embodiment taken in conjunction with the accompanying drawings wherein.

DETAILED DESCRIPTION OF THE INVENTION

In the following, a preferred embodiment of the present invention will be described referring to the accompanying drawings.

Figure 1:
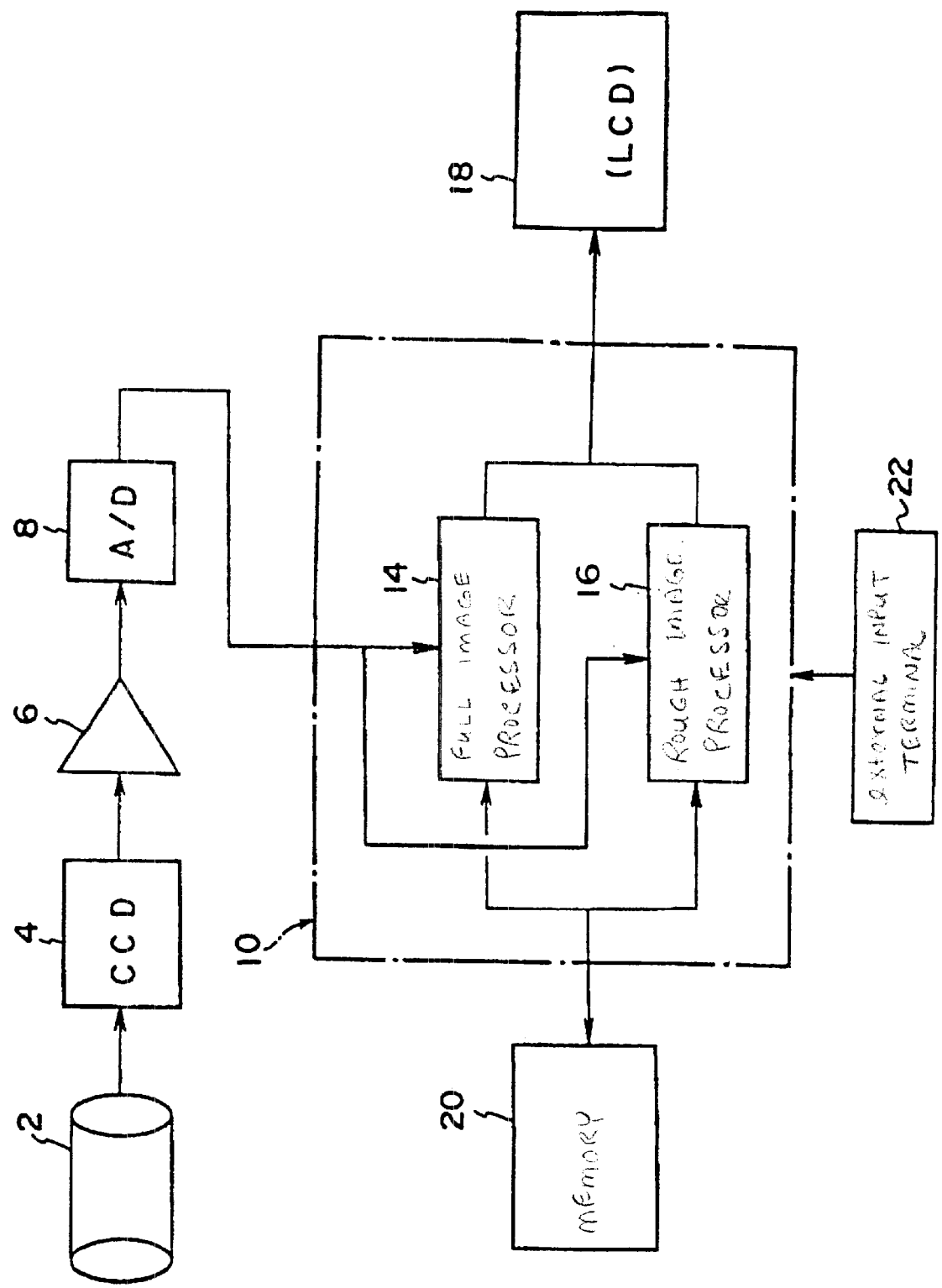
FIG. 1 is a block diagram showing the structure of a digital camera according to a preferred embodiment of the present innovation.

FIG. 1 is a diagram showing the structure of a digital still camera according to a preferred embodiment of this invention. An optical system 2 comprises a lens, a shutter, and so on, and forms an image of an object on image elements of a CCD 4. In the CCD 4, image information is converted into an analogue signal. The analogue signal is amplified by an amplifier 6 and then converted into a digital signal by an A/D converter 8 before being supplied as an image input to a controller 10. Note that an image input comprises pixel data representing colors of respective pixels.

In addition to various image processing (described later), the controller 10 controls the entire operations of the camera. It performs pre-processing of an image input supplied, including noise removal, white balance adjustment, and gamma adjustment, before outputting the image input into a full image processor 14 and a rough image processor 16. Pre-processing may be performed by means of hardware provided upstream of the A/D converter 8 or by respective image processors.

The full image processor 14 performs image processing including image compression and expansion. For compression, the JPEG method, an international standard method for compressing still image data, or other methods may be employed.

An image input is encoded via compression here into full image data, or primary data, which is used as normal image recording data. Full image data allows reproduction of vivid images.

In addition to the above, the full image processor 14 performs display processing of full image data which has been read from a memory 20 to the controller 10. Display processing includes data expansion for decoding, color correction (mentioned above), picture size changing, and so on. With picture size changing, pixel data of image data is limited so as to fit to the size of the screen of a digital still camera which is generally small and thus includes a smaller number of vertical and horizontal pixels. Note that display processing also includes various processing other than the above, such as data reading from a memory or transmitting to a display by the controller 10.

Data compression and expansion may also be performed by a dedicated IC which is, for instance, externally provided to the controller 10 as a part of the full image processor 14. For generation of full image data, the controller 10 changes color data of image data from RGB to YCC and outputs the image data to the IC for compression. For display processing, on the contrary, the IC expands compressed data and supplies it to the controller 10 for other processing.

In the rough image processor 16, different from the full image processor 14, data compression/expansion is not performed. Instead, sub-sampling processing is carried out to limit pixel data of an image input, thereby generating rough image data, or secondary data. Rough image data is generated so as to meet such a requirement that an image created based thereon be clear enough to distinguish an object, and thus does not require high image quality. Therefore, a drop in resolution at the time of reproduction is not a problem for rough image data. That is, rough image data can be rephrases as data generated by limiting data volume in view of the above.

In this embodiment, the volume of rough image data is suppressed to be, for instance, about 10 Kbytes. This is less than 1/10 of the volume of full image data for a present digital still camera, which is, for instance, about 100 Kbytes. As a result of limiting, the size of a picture relative to rough image data is smaller than that of a camera screen (i.e., the numbers of vertical and horizontal pixels).

As described above, it has been known to record index image data, such as thumbnail image, separately from full image data. Some index image data is non-compressed and has a significantly reduced data volume due to limiting. Such index image data meets the aforementioned requirement for rough image data of this embodiment, and thus can also be used as rough image data in this embodiment.

In addition to the above, the rough image processor 16 performs display processing to rough image data which has been read from the memory 20 to the controller 10. Display processing mainly includes color correction (mentioned above) and picture size changing. Picture size changing here requires interpolation of pixel data. As it is smaller than a camera screen, a picture relative to rough image data should be given extra pixel data by interpolation so as to match the size of the image display device 18.

Figure 2:
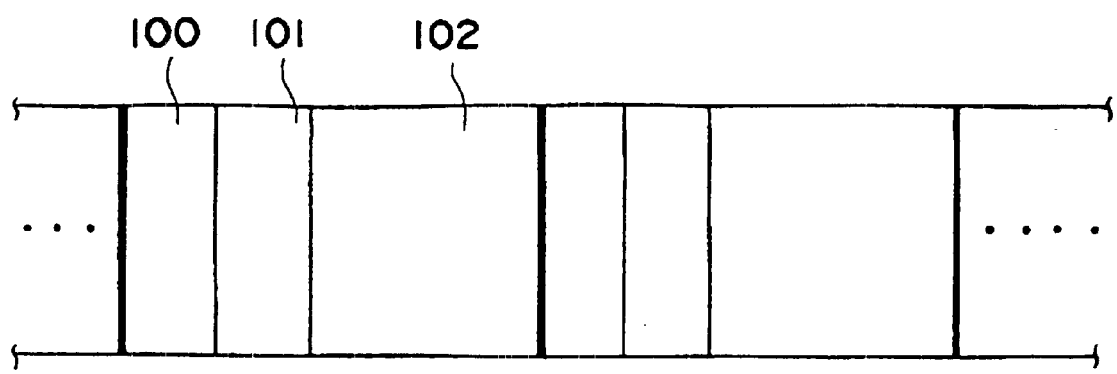
FIG. 2 is a diagram explaining a memory area of a memory of the camera shown in FIG. 1.

The controller 10 is connected to the memory 20 and the image display device 18. The memory 20 comprises a flash memory for storing full image data generated by the full image processor 14 and rough image data generated by the rough image processor 16. FIG. 2 depicts memory areas of the memory 20. In the memory 20, a header area 100, a rough image area 101, and full image area 102 are set for every photographed image. In a header area 100, various information regarding a photographed image, such as an image frame number, is recorded. In the rough image area 101 and full image area 102, rough image data and full image data are respectively recorded. A rough image area 101 is smaller than a full image area 102 as rough image data has a significantly smaller volume than full image data.

After display processing either by the full image processor 14 or the rough image processor 16, the controller 10 supplies image information to the image display device 18 which comprises an LCD for a display screen. The image display device 18 then converts the image information supplied into a video signal to display it on the LCD.

The controller 10 is further connected to an external input terminal 22. When a user instructs various operations with commands using operation buttons on the camera body, these commands are inputted via the external input terminal 22 to the controller 10. User command includes (1) "switching between a shooting mode and a reproduction mode," and (2) "displaying the next picture." A "displaying the next picture" command is a command for displaying a picture having an image frame number larger by one than that for the picture being displayed, and a backward command for a picture having an image frame number smaller by one.

The controller 10 is constructed so as to be connectable to an external display or computer. With these connected, the controller 10 supplies data which has been read from the memory 20 to these external devices.

Next, an operation of a camera according to this embodiment in a shooting mode will be described. With a shooting mode set, the image of an object is displayed on the image display device 18. Looking at either the image display device 18 or a finder (not shown), the user directs the camera at a desired object. The brightness of the object is detected using outputs of light receiving elements (not shown), so that an exposure time and an aperture value for the shutter of the optical system 2 are accordingly determined. The shutter is opened/closed by using a shutter button (not shown) so that the image of the object is exposed on the CCD 4. The CCD 4 outputs a signal, which is amplified by the amplifier 6 and then converted into a digital signal by the A/D converter 8 before being inputted as an image input into the controller 10.

In the controller 10, the predetermined pre-processing mentioned above is performed. The full image processor 14 and the rough image processor 16 generate full image data and rough image data, respectively, based on an image input supplied. Subsequently, both data are transmitted from the controller 10 to the memory 20 to be stored therein along with header information.

Referred to FIG. 3, the operation of a camera according to this embodiment in a reproduction mode will be described. When a user command for mode switching from a shooting mode to a reproduction mode is inputted into the controller 10, so that a reproduction mode is set (S10). In the camera of this embodiment, a picture last shot in the shooting mode is set to be initially displayed in the reproduction mode. Thus, after a reproduction mode was set, processing after step S10 is performed to image data for a picture having the largest image frame number.

Specifically, rough image data is read from the memory 20 (S12) and subjected to display processing in the rough image processor 16 (S14). Display processing here mainly includes color correction and picture size changing. Here, interpolation is applied to change the size of a relevant picture to have it match in size the LCD of the image display device 18, as mentioned above. As it is not subjected to JPEG compression, rough image data can be used intact as display data only with the picture size changed. Display processing at step S14 therefore can be completed in a minimum time. Image data subjected to display processing is then supplied to the image display device 18 so that a relevant image is displayed on the LCD (S16).

Upon completion of display processing for rough image data, the controller 10 reads full image data with the same image frame number as that of the rough image data being displayed from the memory 20 (S18), so that the full image processor 14 performs display processing to the full image data (S20). Display processing here includes, as described above, data expansion for decoding, color correction, and picture size changing. The picture size is reduced here as a picture relevant to full image data is larger than the display screen. Since display processing for full image data includes expansion, it takes some time.

In this embodiment, reading and display processing for rough image data for one picture is performed at once at steps S12 and S14, respectively, whereas those for full image data for one image is performed at once at steps S12 and S14, respectively, whereas those for full image data for one image is performed over several divided stages. This difference in processing methods for rough and full image data is attributable to the difference in the nature of respective image data.

In the steps S18 and S20, the first stage of the several divided processing stages for full image data is performed. With the first stage completed at step S20, the control 10 then judges whether or not a user's interruption command for displaying the next image picture has been inputted via the external input terminal 22 (S22). Although the command is either a forward command or a backward command as mentioned above, at this stage, where the last shot picture has been processed for display, only a backward command is to be received. If a next picture display command is received at step S22, the ongoing display processing with respect to full image data is disconnected, so that the operation flow returns to step S10 to start identical processing to the above with respect to the next picture.

On the other hand, if no interrupt command is received at step S22, whether or not display processing for full image data has been completed is detected (S24). If uncompleted, the operation flow returns to step S18 to continue reading and display processing for full image data so that the next stage of the several remaining divided display processing stages for the full image data is performed.

When display processing for full image data completes at step S24, the data is supplied to the image display device 18 so that a corresponding picture is displayed on the LCD (S26). In displaying, the rough image picture being displayed is replaced by a full image picture. In replacing, the rough image pictures is overwritten by a corresponding full image picture from left to right and upper to lower of the LCD for every partial band area having a predetermined width. With this manner of replacement, the picture on the display is smoothly shifted while avoiding abrupt changing or momentary disappearance of a displayed picture. Thus, the user does not feel a sense of incongruity. It should be noted that a picture may be overwritten not only from upper to lower and left to right, as above, but also diagonally. The width of a band area for sequential overwriting may be desirably set, such as the width for one scan line.

When the above picture switching has been completed, input of a user command for displaying the next picture is again awaited, similar to step S22. Specifically, whether or not a next picture display command has been inputted is judged (S28). This judgment will be repeatedly made until issuance of a command is detected. Until this detection, the full image picture remains displayed. With a command detected, the operation flow returns to step S12 where identical processing to the above is carried out to image data for a picture with the next image frame number.

Next, an operation of a camera according to this embodiment with a computer externally connected thereto will be described. The controller 10 reads recorded data from the memory 20 and supplies it to the computer. The computer performs display processing to a plurality of rough image data supplied. It then divides the display screen into a plurality of regions to display each rough image picture for every region. With this arrangement, a user is able to review a plurality of photographed images at the same time. In this manner, rough image data is also used as index image data which is applied when using external devices, such as a computer.

By the way, a user utilizes reproduction display function to display images so as to review photographed images. Specifically, a user sequentially displays a plurality of images one by one using a forwarding or backwarding operation. For review, a user may take sufficient time to examine each image or moves on without spending much time on each. This reproduction operation will next be described using a comparison between a conventional camera and a camera of this invention. In the following description, it is assumed that a user searches for one particular image from among many images.

Figure 4:
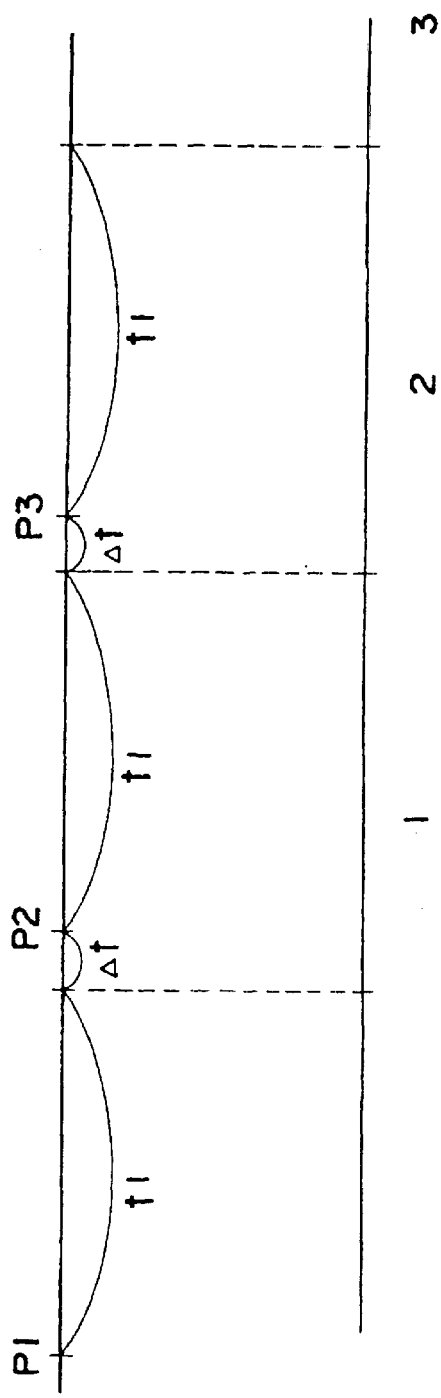
FIG. 4 is a time chart for a reproduction operation by a conventional camera.

FIG. 4 is a timing chart for a reproduction operation by a conventional camera. When a user sets a reproduction mode (P1), the last shot picture is initially displayed. With a conventional camera, only full image pictures are displayed. That is, the first full image picture is displayed after a reproduction awaiting time, namely, t1, from setting the mode (P1), wherein t1 is relatively long such as a few seconds.

If this picture is not the one the user wants, he or she inputs a next picture display command (backwarding) P2. This judgment by the user takes Dt. Subsequently, the second full image picture is displayed after a reproduction waiting time t1 from input of the command P2. This whole process has to be repeated until the user finds his desired picture. Since it takes a long time to display one picture to review it with a conventional camera, the entire period of time spent before a desired image is found is inevitably prolonged.

Figure 5:
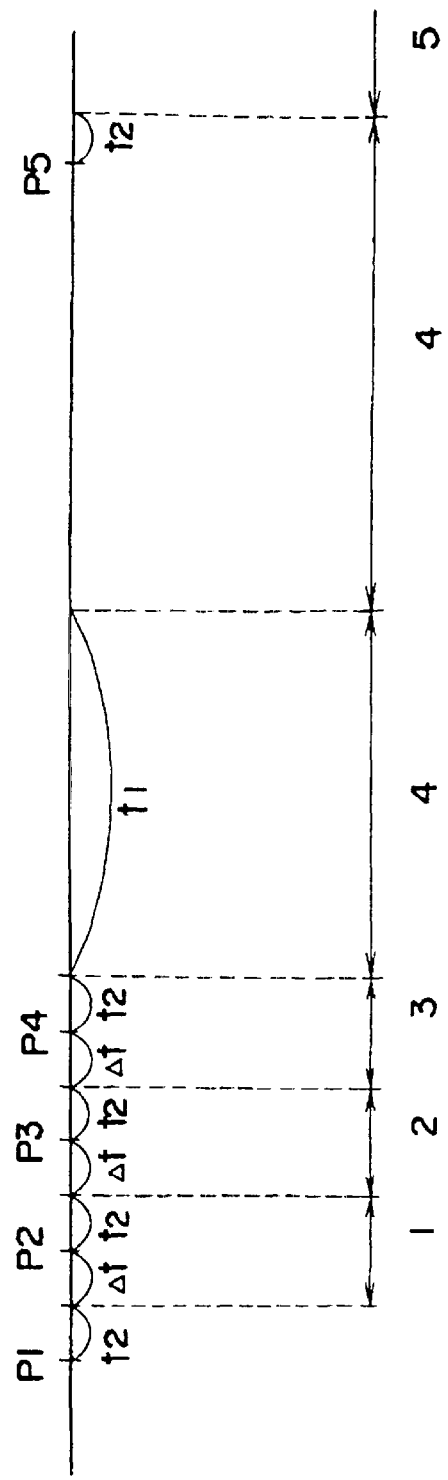
FIG. 5 is a time chart for a reproduction operation by a camera according to the preferred embodiment of the present invention.

FIG. 5 is a timing chart for a reproduction operation by a camera of this embodiment. When a user sets a reproduction mode (P1), the last shot picture is initially displayed. According to the flowchart shown in FIG. 3, a rough image is initially displayed (S16 in FIG. 3), in which a reproduction waiting time t2 is significantly shorter than that t1 for a full image picture, for instance, being 1/10 of the latter.

Although a rough image picture, having only low resolution, is not clear enough to present details and conditions of photographed images, it is still clear enough to distinguish an object shown. If the full image picture initially displayed is not the one the user wants, he or she inputs a next picture display command (backwarding) P2. This judgment by the user takes Dt, similar to the process shown in FIG. 4. In response to the command P2, display processing ongoing to full image data is disconnected, as shown in S22 in FIG. 3, and display processing for the second rough image picture is started instead so as to display a corresponding picture. A reproduction waiting time here is t2.

This whole process will be repeated until the user finds his desired image. Assume that the fourth picture from the last shot one is the picture he wants. The user stops advancing pictures when the fourth rough image picture is displayed. Then, display processing for full image data for a corresponding image is continued to be completed. After a reproduction waiting time t1, the rough image picture on display is replaced by a corresponding full image picture. With a full image picture displayed, the user can examine the photographic condition of the image. Thereafter, if the user inputs a next picture display command p5, the fifth rough image will then appear.

As described above, according to this embodiment, a period to time from input of a user's instruction to display a picture to displaying of the picture concerned, is significantly reduced, so that the user scarcely has to wait until a picture is displayed. Moreover, the user is able to examine the details of a photographed object by examining a full image picture displayed. Further, a period of time necessary for a user to reproduce and examine photographed images one by one is significantly reduced. Thanks to these advantages, a digital still camera according to this embodiment has higher product value.

Also, since index image data is used also as rough image data in the above, the present invention can be achieved without including either a structure for generating rough image data in a controller 10 or a memory area for storing rough image data in the memory 20.

Although the last shot picture is initially displayed in the above, any desired photographed picture, for instance, the initially shot picture, may be set for an initial display.

Figure 3:
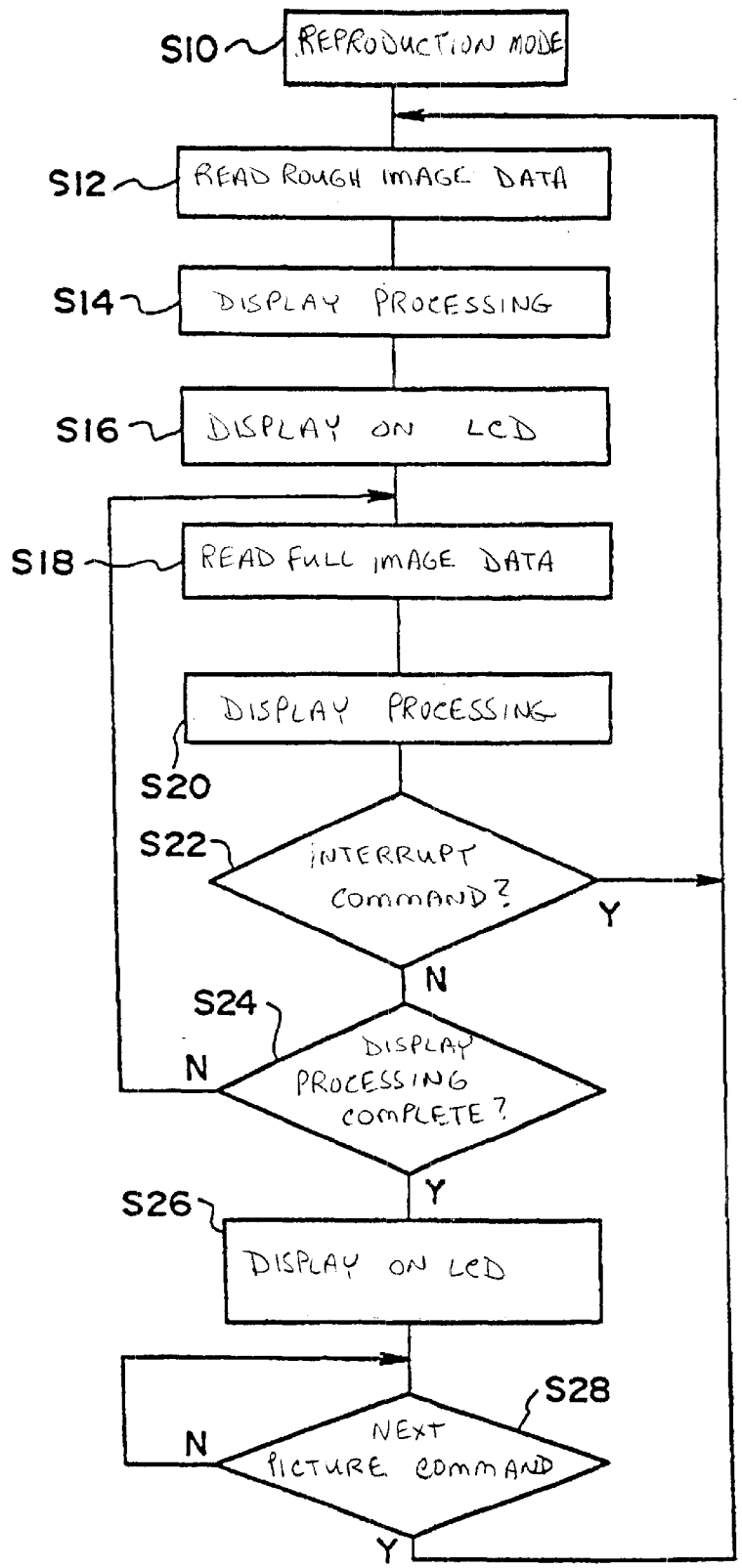
FIG. 3 is a flowchart for an operation of a camera according to the preferred embodiment of this present invention in a reproduction mode.

Further, display processing for rough image data and for full image data may be performed in parallel, instead of serially as above in the flowchart in FIG. 3.

While there have been described what are at present considered to be preferred embodiments of the invention, it will be understood that various modifications may be made thereto, and it is intended that the appended claims cover all such modifications as fall within the true spirit and scope of the invention.

PARTS LIST

FIG. 1
2 optical system
6 amplifier
14 full image processor
16 rough image processor
18 display
20 memory
22 external input terminal
FIG. 2
100 header
101 rough image
102 full image
FIG. 3
S10 set reproduction mode
S12 read rough image data
S14 display process for rough image
S16 display rough image
S18 read full image data
S20 display process for full image
S22 next picture display instructed ?
S24 display process for full image completed?
S26 display full image by replacement
S28 next image display instructed ?
FIG. 4
    user operation
    display image
    full image 1, 2, 3
FIG. 5
    Rough image 1, 2 . . .

What is claimed is:

1. A method for using a digital camera to capture and display images on an image display device of the digital camera, comprising the steps of:
   (a) capturing a plurality of images;
   (b) storing in a memory, primary image data and secondary image data, the primary image data providing accurate reproduction of the captured image, and the secondary image data providing an index image which can be used by an external device to display the plurality of images in a corresponding plurality of regions on a display screen of the external device;
   (c) retrieving the secondary image data from the memory for a first image;

(d) processing the secondary image data for the first image to produce a processed secondary image having additional pixel data;

(e) displaying the processed secondary image on the image display device;

(f) retrieving the primary image data from the memory for the first image;

(g) processing the primary image data for the first image to produce a processed primary image having a reduced picture size; and (h) replacing the display of the processed secondary image for the first image on the image display device with a display of the processed primary image for the first image automatically after the completion of step (g).

2. The method according to claim 1 further including the steps of:

(i) stopping step (g) when a predetermined command is externally inputted;

(j) retrieving the secondary image data from the memory for a second image;

(k) processing the secondary image data for the second image to produce a processed secondary image having additional pixel data; and (l) displaying the processed secondary image for the second image on the image display device.

3. The method according to claim 1 wherein step (h) includes overwriting the processed secondary image for the first image with the processed primary image for the first image using partial band areas having a predetermined width.

4. The method according to claim 1 wherein the first image is the last captured image of the plurality of captured images.

5. The method according to claim 1 wherein the processing in steps (d) and (g) is performed in parallel.

6. The method according to claim 1 wherein the size of the processed secondary image produced in step (d) matches the size of the image display device.

7. The method according to claim 1 wherein step (d) includes interpolating the secondary image data so that the size of the processed secondary image matches the size of the image display device.

8. The method according to claim 7 wherein step (g) is performed over a plurality of divided stages.

9. The method according to claim 1 wherein the memory is a detachable memory card.

10. A method for using a digital camera to capture and display images on an image display device of the digital camera, comprising the steps of:

(a) capturing a plurality of images;

(b) storing in a memory, primary image data and secondary image data, the primary image data providing accurate reproduction of the captured image, and the secondary image data providing an index image which can be used by an external device to display the plurality of images in a corresponding plurality of regions on a display screen of the external device;

(c) retrieving the secondary image data from the memory for a first image;

(d) processing the secondary image data for the first image to produce a processed secondary image having additional pixel data;

(e) displaying the processed secondary image on the image display device;

(f) retrieving the primary image data from the memory for the first image;

(g) initiating processing of the primary image data for the first image to produce a processed primary image having a reduced picture size;

(h) stopping step (g) when a predetermined command is externally inputted;

(i) retrieving the secondary image data from the memory for a second image;

(j) processing the secondary image data for the second image to produce a processed secondary image having additional pixel data;

(k) displaying the processed secondary image for the second image on the image display device;

(l) processing the primary image data for the second image to produce a processed primary image having a reduced picture size; and (m) replacing the display of the processed secondary image for the second image on the image display device with a display of the processed primary image for the second image automatically after the completion of step (l).

11. The method according to claim 10 wherein step (m) includes overwriting the processed secondary image for the second image with the processed primary image for the second image using partial band areas having a predetermined width.

12. The method according to claim 10 wherein the first image is the last captured image of the plurality of captured images.

13. The method according to claim 10 wherein the processing in steps (d) and (g) is performed in parallel, and the processing in steps (j) and (l) is performed in parallel.

14. The method according to claim 10 wherein the size of the processed secondary image produced in step (d) matches the size of the image display device.

15. The method according to claim 10 wherein step (d) includes interpolating the secondary image data so that the size of the processed secondary image matches the size of the image display device.

16. The method according to claim 15 wherein step (g) is performed over a plurality of divided stages.

17. The method according to claim 10 wherein the memory is a detachable memory card.

* * * * *